UNITED STATES PATENT OFFICE 2,361,259

CYANOETHYLATED NITRO COMPOUNDS AND PROCESS FOR PREPARING SAME

Herman A. Bruson, Philadelphia, Pa., assignor to The Resinous Products & Chemical Company, Philadelphia, Pa., a corporation of Delaware No Drawing. Application May 1, 1941, Serial No. 391,349

3 Claims. (Cl. 260—464)

This invention relates to β-cyanoethyl derivatives of organic nitro compounds and a method for their preparation.

I have found that organic compounds having a reactive hydrogen-bearing carbon atom contiguous to a nitro group react with acrylonitrile in the presence of an alkaline condensing agent so as to replace one or more of the active hydrogen atoms of said reactive group by a β-cyanoethyl radical.

The reaction takes place readily with mononitro as well as poly-nitro paraffins and their derivatives, such as their aryl, aralkyl or cycloalkyl substituted derivatives. Of particular interest for the purpose because of their availability are the following: Nitromethane, nitroethane, 1-nitropropane, 2-nitropropane, the nitrobutanes, nitropentanes, nitrohexanes, phenyl nitromethane, nitrocyclohexane, nitro-anthrone, 1,3-dinitro-2,2-dimethyl propane, and the like.

As alkaline condensing agents there may be mentioned the oxides, hydroxides, amides, hydrides, or alcoholates of the alkali metals, hydroxides of the alkaline earth metals, and strongly basic non-metallic hydroxides, such as quaternary ammonium hydroxides. These may be employed in inert solvents or suspending agents for the reactants as, for example, dioxane, benzene, or ether or in media less reactive than the nitrocompounds, such as tertiary butanol or water. The more stable alkalies, such as sodium hydroxide, potassium hydroxide, trimethyl benzyl ammonium hydroxide, triethyl benzyl ammonium hydroxide and the like can be used in aqueous solution for the purpose.

The quantity of alkaline condensing agent used is small, amounts of the order of 0.5 to 10% on the weight of the reactants being usually sufficient. The condensation occurs readily at temperatures below about 80° C., preferably from about 30° to 60° C., and is often exothermal so that cooling is advantageous in order to prevent undesired side reactions. Depending upon the number of available reactive hydrogen atoms on carbons contiguous to the nitro group, one or more —CH₂CH₂CN groups can be introduced.

The products are useful as insecticides and as intermediates for the preparation of amines, polyamines, amides, and carboxylic esters, for use in the preparation of synthetic resins, plasticizers, and drugs.

The following examples illustrate this invention.

Example 1

Acrylonitrile (26.5 g.) was added dropwise during 40 minutes to a solution of 44.5 g. of 2-nitropropane, 50 g. of dioxane, and 4 g. of aqueous 38% trimethyl benzyl ammonium hydroxide while the reaction mixture was stirred and maintained between 30° and 35° C. by external cooling. The solution was allowed to stand 18 hours at room temperature, after which it was neutralized with dilute hydrochloric acid. It was then taken up in ethylene dichloride and washed thoroughly with water. The ethylene dichloride extract was evaporated under reduced pressure on a steam bath to yield 68 g. of pale amber-colored oil. Upon distillation in high vacuo, the product, γ-methyl-γ-nitrovaleronitrile

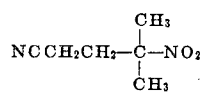

came over as a pale yellow oil boiling at 105–107° C./1 mm.

Example 2

To a solution consisting of 61 g. of nitromethane, 60 g. of tertiary butanol and 5 g. of aqueous 38% trimethyl benzyl ammonium hydroxide solution there was added dropwise during one-half hour, 53 g. of acrylonitrile while the reaction mixture was stirred and maintained at 35–38° C. by means of external cooling. After all had been added, the mixture was allowed to stand 18 hours at room temperature, during which time a crystalline mass separated. The mixture was stirred, neutralized with dilute hydrochloric acid, and the crystals filtered off. The yield was 25 grams. Upon recrystallization from ethanol, the product formed colorless needles melting at 114° C. The original filtrate, upon evaporation under reduced pressure, yielded 35 g. of crystalline residue from which an additional 17 grams of product, melting point 114° C., was recovered by recrystallization from ethanol. The product analyzed for tri-(β-cyanoethyl) nitromethane having the formula

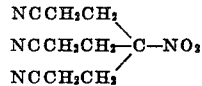

Example 3

To a solution of 44.5 g. of 1-nitropropane, 50 g. of dioxane, and 4 g. of aqueous 38% trimethyl benzyl ammonium hydroxide solution there was added dropwise during 45 minutes 53 g. of acrylonitrile, while the reaction mixture was stirred and maintained at 30–37° C. by means of external cooling. The mixture was then stirred and warmed to 40–45° C. for two hours. It was allowed to cool, then neutralized with dilute hydrochloric acid, taken up in ethylene dichloride, and washed with water. The ethylene dichloride layer was evaporated to dryness under reduced pressure on a steam bath, leaving 55 g. of a dark, oily residue.

Upon distillation in high vacuo, there was obtained 19 g. of product boiling at 108–112° C. at 1 mm. pressure. Upon redistillation, it boiled at 110° C./1 mm. and came over as a pale yellow oil corresponding by analysis to a mono-cyanoethylation product having the formula

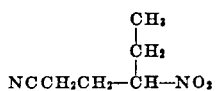

The non-distillable residue, weighing 30 g., consisted essentially of the di-cyanoethylated derivative

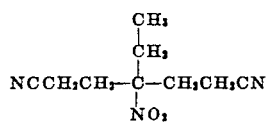

Example 4

To a solution of 37.5 g. of nitroethane in 50 g. of dioxane and 4 g. of aqueous 38% trimethyl benzyl ammonium hydroxide solution there was added dropwise during one-half hour 26.5 g. of acrylonitrile while the reaction mixture was stirred and maintained at 20–25° C. by means of external cooling. The mixture was stirred at 20° C. for two hours longer, neutralized with dilute hydrochloric acid, washed thoroughly with water, and distilled in vacuo at 2 mm. pressure. The product, γ-nitrovaleronitrile, $$CH_3-CH(NO_2)-CH_2CH_2CN$$

came over at 107–110° C./2 mm. as a pale yellow oil. The residual oily di-cyanoethylation product

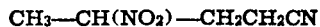

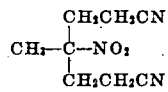

decomposed upon distillation in vacuo.

Example 5

To a stirred mixture consisting of 17 g. of 9-nitroanthrone, 100 g. of dioxane, and 4 g. of aqueous 40% trimethyl benzyl ammonium hydroxide, there was added 3.8 g. of acryonitrile. The mixture was stirred for 48 hours at room temperature, then neutralized with dilute hydrochloric acid, mixed with 200 cc. of water, and the crystals filtered off, washed and air-dried. The yield was 16 g. of an orange-colored crystalline powder melting above 270° C., having the probable formula

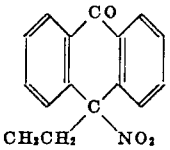

I claim:

1. A process for preparing tri-(β-cyanoethyl) nitromethane which comprises reacting acrylonitrile and nitromethane in the presence of trimethyl benzyl ammonium hydroxide.

2. As a new compound, the product having the formula

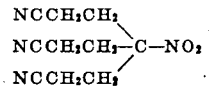

3. A process for preparing tri-(β-cyanoethyl) nitro-methane which comprises reacting acrylonitrile and nitromethane in the presence of an alkaline condensing agent.

HERMAN A. BRUSON.